United States Patent [19]

Swanson et al.

[11] Patent Number: 4,966,237
[45] Date of Patent: Oct. 30, 1990

[54] METHOD OF EFFECTING EXPANDING CHEMICAL ANCHOR/SEALS FOR ROCK CAVITIES

[75] Inventors: David E. Swanson, West St. Paul; Michael X. Schlumpberger, Eagan, both of Minn.

[73] Assignee: The United States of America as represented by the Secretary of the Interior, Washington, D.C.

[21] Appl. No.: 383,111

[22] Filed: Jul. 20, 1989

[51] Int. Cl.$^5$ ............... E21B 33/138; E21B 43/26; E02D 3/12
[52] U.S. Cl. .................................. 166/292; 166/281; 405/263; 405/266
[58] Field of Search ............ 405/260, 263, 266, 267, 405/269; 166/281, 285, 287, 292, 293, 294, 295; 106/89

[56] References Cited

U.S. PATENT DOCUMENTS

| | | | |
|---|---|---|---|
| 2,939,533 | 6/1960 | Coberly | 166/285 X |
| 2,986,217 | 5/1961 | Johnston | 166/285 X |
| 3,583,165 | 6/1971 | West et al. | 405/266 |
| 3,878,686 | 4/1975 | Hageman et al. | 405/264 |
| 3,995,694 | 12/1976 | Frieburger | 166/285 |
| 4,002,483 | 1/1977 | Daugherty et al. | 106/89 |
| 4,252,474 | 2/1981 | Botes | 405/266 |
| 4,328,036 | 5/1982 | Nelson et al. | 166/293 X |
| 4,537,535 | 8/1985 | MacBain | 405/260 |
| 4,797,159 | 1/1989 | Spangle | 166/292 X |

Primary Examiner—George A. Suchfield
Attorney, Agent, or Firm—E. Philip Koltos

[57] ABSTRACT

Method of sealing a cavity formed in a rock against the passage of fluids without fracturing the rock, by placing wadding in the cavity and adding a supply of expanding chemical grout to effect a seal upon hardening.

10 Claims, 1 Drawing Sheet

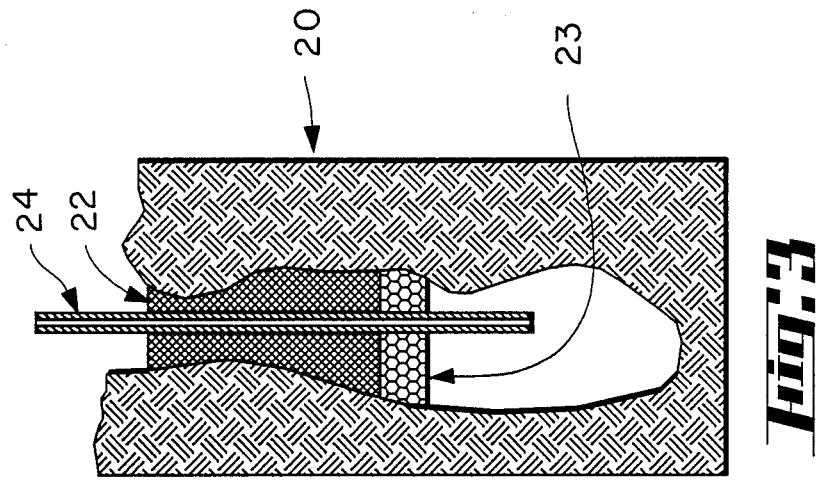
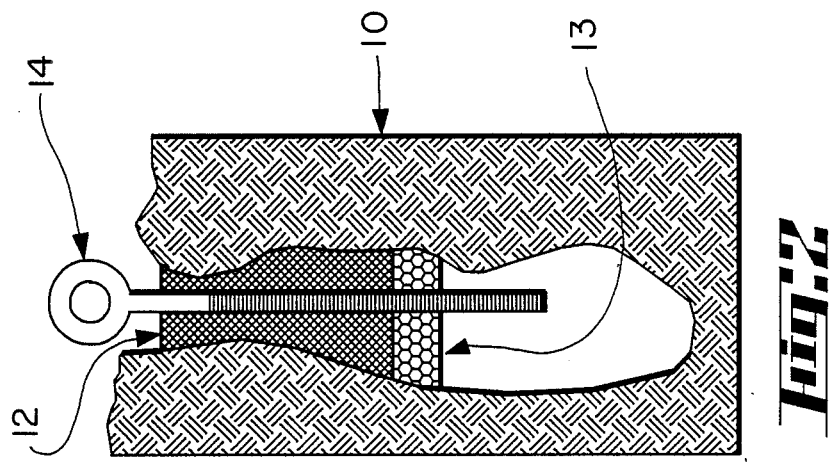
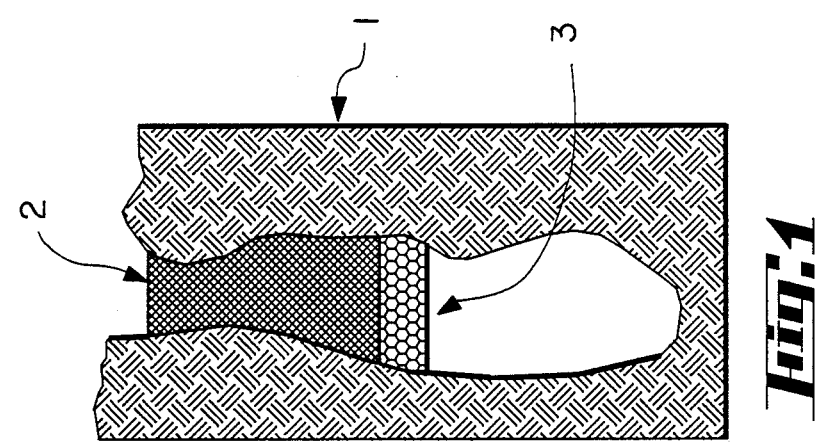

METHOD OF EFFECTING EXPANDING CHEMICAL ANCHOR/SEALS FOR ROCK CAVITIES

FIELD OF THE INVENTION

The invention relates to a method of effecting chemical anchor seals for cavities formed in rock such as boreholes, wells and fissures, against the passage of fluids.

BACKGROUND OF THE INVENTION

In the fields of mining, petroleum production, civil and geological engineering, and construction, there is a need to improve sealing techniques, which are dominated by the use of cements, epoxies and liquid products; however, these seals are attendant with many difficulties when it comes to either the effectiveness of the seal or the ability of the seal to withstand high pressure without the passage of fluids.

In the process of effecting anchoring or sealing, liquid products that harden subsequent to emplacement in a cavity have one or more of the following drawbacks: inadequate sealing due to shrinkage during curing, insufficient adhesion, inability to respond to minor deformation of the surrounding cavity, and gravitationally induced flow away from upper surfaces in the case of horizontally aligned cavities.

On the other hand, expanding chemical grouts have been commercialized to make non-explosive demolition agents, however, manufacturers of expanding chemical non-explosive demolition agents caution that these agents must be used for their designated purposes of either fracturing rocks or fracturing concrete. In such a fracturing process, any seal which may have been provisionally effected is also shattered.

Therefore, a need exist in all of the aforementioned areas for a method which will effect a seal by using a chemical grouting material when it is desired not to fracture or demolish rock structures having cavities therein.

SUMMARY OF THE INVENTION

In accordance with the present invention, a method has been devised for sealing a cavity in a rock formation against passage of fluids without fracturing walls of said cavity, by placing in said cavity, a material capable of confining the flow of a supply of a hardenable and volume expandable chemical grout which occupies a given volume in its initial unhardened and unexpanded condition, and an increased volume relative to said given volume in its hardened condition, to exert an expansive force against confining surfaces; adding into said cavity and against said material capable of confining the flow, a hardenable and volume expandable chemical grout material adapted to exert pressure and effect an expanded seal upon curing, between confining surfaces of the cavity and the material capable of confining the flow of the grout.

DESCRIPTION OF THE DRAWINGS

FIG. 1 depicts a cross section of a cavity in a rock, wherein wadding is positioned within the cavity and an expanding chemical grout is placed above the wadding to effect a seal.

FIG. 2 depicts a cross section of a cavity in a rock, wherein wadding is positioned within the cavity, expanding grout is placed above the wadding, and a high strength bolt is embedded within the grout for anchoring in place after the grout expands.

FIG. 3 depicts a cross section of a cavity in a rock, wherein high-pressure tubing and wadding are together positioned within a cavity and expanding grout is placed above the wadding and around a section of the tubing to function as a high pressure injection seal.

DETAILED DESCRIPTION OF THE INVENTION

The invention employs grouting compounds of the non-explosive demolition type, such as S-Mite ® and Bristar ® for sealing a hole formed in a rock structure, anchoring an object in a cavity formed in a rock or effecting a high pressure seal about a conduit placed in a rock cavity for purposes of injecting fluids under pressure. Typically, the S-Mite ® formulation is as follows on a weight basis:

| | |
|---|---|
| $SiO_2$ | 0.6% |
| $Al_2O_3$ | 0.5% |
| $Fe_2O_3$ | 1.6% |
| CaO | 89.1% |
| MgO | 1.7% |
| $SO_3$ | .01% trace |
| Ignition Loss | 6.5% |

In FIG. 1, there is depicted a cross section of a cavity in a rock, wherein wadding 3, is positioned within cavity 1, and expanding grout 2, is emplaced above the wadding to effect a seal.

It is critical to the invention that the expanding grout, which may be liquid when emplaced, fills the intended sealing area as the grout hardens. Failure to do so may result in inadequate seal formation.

EXAMPLE 1

About 20% water and about 80% dry grouting compound on a weight basis were mixed together. Within 10 minutes after mixing, the expanding grout mixture was placed within a hole in rock as shown in FIG. 1, with the exception that no wadding was previously placed in the hole. The emplacement of the expanding grout mixture was found to be inadequate, because without the wadding, the fluid grout mixture was gravitationally induced to flow away from the intended sealing area of the hole, causing the expanding grout mixture to relocate to the bottom of the hole in the rock. With this deficient emplacement of the expanding grout mixture, an inadequate seal was formed in the intended sealing area and flow of materials past the intended sealing area was not prevented.

When confined, non-explosive demolition agents such as "S-Mite" and "Bristar" generate expansive stress that increase with time. It is also critical to the invention that the expanding grout not fracture the surrounding structure of the cavity because the grout will not harden without confinement and the grout seal may not be effective if cracks are created in surrounding structure after the grout has hardened. Unless controlling measures are taken, the expanding grout mixture may fracture the surrounding structure within the intended period of use.

EXAMPLE 2

Same as Example 1 with the exception that wadding was used to contain a supply of the expanding grout mixture in the intended sealing area. The expanding grout mixture was placed in the intended sealing area and was restrained from gravitationally induced flow by the wadding. After about 6 hours from the time of mixing the expanding grout mixture was transformed from its initially fluid condition to that of a partially hardened cement and started generating expansive stresses against the confining walls of the surrounding rock, enabling the formation of a seal. With passage of time, continued generation of expansive stress by the expanding grout mixture strengthened the seal. However, after about 3 days, the additional generation of expansive stress eventually fractured the surrounding rock structure with cracks radiating from the hole into the rock structure. The cracks radiating from the hole into the rock structure presented a path for movement of materials around the hardened expanding grout mixture and destroyed the seal created by the expanding grout mixture.

EXAMPLE 3

Same as Example 2 with the exception that the expanding grout mixture was about 20% water, 40% grouting compound, and 40% of fine silica sand by weight. With the expanding grout mixture confined from gravitationally induced flow by the wadding, the expanding grout mixture filled the intended sealing area as a fluid. After about 6 hours after mixing, the expanding grout mixture was transformed from its initially fluid condition to that of a partially hardened cement and started generating expansive stresses against the confining walls of the surrounding rock enabling the formation of a seal. With passage of time, continued generation of expansive stress by the expanding grout mixture strengthened the seal. With additional passage of time, additional generation of expansive stresses did not fracture the surrounding rock and the seal created by the expanding grout mixture remained intact.

For materials that are beyond the fragmentation capabilities of non-explosive demolition agents such as "S-Mite" and "Bristar," the method of the invention shown may be used without diminishing the expansive capabilities of the grout to achieve an effective seal over a long duration.

EXAMPLE 4

Same as Example 2 with the exception that wadding in the form of foam rubber and expanding grout mixture were placed in 20,000 psi rated stainless steel cylinder instead of a hole in rock. With the expanding grout mixture confined from gravitationally induced flowage by the wadding, the expanding grout mixture filled the intended sealing area as a fluid. After about 6 hours from the time of mixing, the expanding grout mixture was transformed from its initially fluid condition to that of a partially hardened cement and started generating expansive stresses against the confining walls of the surrounding stainless steel cylinder, enabling the formation of a seal. With passage of time, continued generation of expansive stress by the expanding grout mixture strengthened the seal. However, with additional passage of time, the additional generation of expansive stress did not fracture the surrounding high pressure rated cylinder and the seal created by the expanding grout mixture remained competent.

Using such a seal as described in Example 4, more than 250 individual tests with varied curing time and length of seal were performed to determine the water pressure required to make the seal fail. For 24 hour curing times, the results demonstrated that a 2 inch long seal will fail at about 13,000 psi water pressure and that a 4 inch long seal will exceed the 20,000 psi capability of the test equipment used.

FIG. 2 shows a cross section of a cavity in rock, wherein a high strength bolt 14, and wadding 13, are positioned together within the cavity 10, and expanding grout 12, is emplaced above the wadding and around a section of the bolt in order to anchor the bolt in place after the grout expands.

EXAMPLE 5

Same as Example 4 with the exception that a steel bolt was used in the manner shown in FIG. 2 in order to anchor the bolt in place after the grout expands. The bolt was pushed through the wadding, the bolt and wadding were positioned together within the steel cylinder, and the expanding grout mixture was placed above the wadding and around a section of the bolt. Using a 1.0 inch outside diameter bolt and a 1.8 inch inside diameter cylinder, the expanding grout mixture was placed above the wadding and around a 6.6 inch long unthreaded section of the bolt, causing the bolt to resist 50,000 pounds of pull-out force when later tested.

FIG. 3 depicts a cross section of a cavity in rock, wherein high-pressure tubing 24, and wadding 23, are positioned together within the cavity 20, and the expanding grout 22, is emplaced above the wadding and around a section of the tubing in order to anchor the tubing in place and effect a high-pressure injection seal.

For high pressure fluid injection seals that require only a few hours of working life and fragmentation of the surrounding structure is not a concern, expanding grout mixtures that are capable of eventually fracturing the surrounding structure may be used. This is especially applicable to the use of the method shown in FIG. 3 for hydraulic fracturing of the surrounding structure by means of high pressure fluid injection.

EXAMPLE 6

Same as Example 2 with the exception that high pressure stainless steel tubing was used in the manner shown in FIG. 3 in order to anchor the tubing in place and effect a high pressure injection seal after the grout Using 0.562 outside diameter and a 0.1875 inch inside diameter stainless steel tubing, the tubing was pushed through the wadding, and the tubing and wadding were positioned together within a 1.5 inch internal diameter bore hole in dolomite rock, and the expanding grout mixture was placed above the wadding and around a six inch long section of the tubing. After allowing the expanding grout mixture to cure for about 18 hours, fluid injection pumping through the tubing into the confined cavity in the dolomite indicated not only that the tubing was securely anchored, but also that the tubing was sealed in place. Injection pressures prior to hydraulic fracturing of the dolomite were as high as 11,000 psi with no evidence of seepage by the seal.

For high pressure fluid injection seals that require a long working life or where the fragmentation of the surrounding structure is a concern, expanding grout mixtures that are not capable of eventually fracturing the surrounding structure may be used.

EXAMPLE 7

Same as Example 3 with the exception that high pressure stainless steel tubing was used in the manner shown in FIG. 3 in order to anchor the tubing in place and effect a high pressure injection seal after the grout expands. The tubing was pushed through the wadding, the tubing and wadding were positioned together within the cavity in rock, and the expanding grout mixture was placed above the wadding and around a section of the tubing. Using a 0.562 inch outside diameter and 0.1875 inch inside diameter stainless steel tubing in a 1.5 inch internal diameter bore hole in dolomite rock, the expanding grout mixture was placed above the wadding and around a 6 inch long section of the tubing. After allowing the expanding grout mixture to cure for about 4 weeks, the tubing was securely anchored and there was no evidence of fracturing in the rock surrounding the bore hole.

It is clear that, for anchoring and sealing in the art to date, the drawbacks of inadequate sealing due to shrinkage during curing, insufficient adhesion, inability to respond to minor deformation of the surrounding cavity, and gravitationally induced flow away from upper surfaces in horizontally aligned cavities have been solved by the method present invention, through expansion and stress applied to confining surfaces. Because the method of the invention uses an expanding grout, shrinkage and other difficulties ensuring proper surface contact are overcome. The method of the invention anchors with friction in addition to adhesion and greatly improved anchoring is thus obtained. This is especially important in applications where adhesive bonding alone is inadequate.

In using expanding chemical grouts in accordance with the method of the invention, the material encompassing the cavity is not demolished. To the contrary, the integrity of the confining cavity is essential to the function of the invention, because the cavity must provide continuing resistance to expansive stress generated by the expanding grout for the maintenance of seals and anchors.

Therefore, the present invention provides methods of: (1) sealing cavities; (2) anchoring objects within cavities; (3) coupling fluid conveying devices to a cavity which lacks conventional fasteners such as threads; and (4) reduces the cost and complexity of some difficult anchoring and sealing applications such as when the cavity is irregular, deformable under stress, or composed of weakly cemented materials.

A wide variety of barriers to movement (such as seals, anchors and couplings) within cavities (such as pipe or tubing, wells, boreholes in rock, and fissures) is thus insured on the closure or plugging, anchoring, and coupling using the invention method.

While the calcium oxide chemical grouts used actively combine with water in a manner that causes them to expand, it should be understood that other grouts will also work; however, while the expansion of calcium oxide through hydration is only apparent in bulk, the volume of slaked lime is actually less than the sum of the volumes of the quick lime and water used in the reaction. The particles of hydrate grow preferentially in certain orientations as hexagonal plate crystals, thrusting particles apart and producing an expansion due to less efficient packing than non-hydrated crystals. Thus, it is believed that the grouts using the invention method expand as the result of chemical hydration and accompanying crystal growth. When prepared and emplaced in accordance with the invention method, swelling of the expanding grouts ensures contact with cavity surfaces and generates stresses against surfaces that restrict further expansion.

With continued hydration and stress generation, the grout hardens and is anchored in place by a combination of mechanisms. Under these conditions, expanding chemical grouts become impermeable to fluids and form a fluid seal against the confining surfaces. These anchoring and sealing capabilities are maintained as long as the cavity resists the expansive forces exerted by the grout, which should not be so great as to fracture the cavity encompassing material.

Using the method of the invention, it is believed that the expanding grout behaves as a visco-plastic, starting as a viscous fluid and transforming to a hardened solid, (with an intermediate putty stage). The transformation from viscous fluid to hardened solid is due in part to the removal of free water from the slurry and chemical incorporation of water into hydrated crystals. Through this incorporation of water in hydration, the total volume of solids and liquids may decrease, and yet the overall mass may expand as a result of the manner of crystal growth. The product of hydration would be a porous and friable powder, if not for the confinement pressure.

Expansive stress is generated as the grout sets. Before setting, the grout is free to expand in a direction of non-confined boundaries. As the grout hardens, expansion in the direction of nonconfinement is inhibited by anchoring within the cavity. This explains why expanding grouts confined on as few as two sides are able to generate stresses exceeding 100 MPa. However, the magnitude of expansive stress generated near non-confined boundaries is reduced by the inadequacy of localized anchoring. This reduction is generally restricted to within a distance equivalent to the cavity's minor diameter at the non-confined boundary.

The anchoring mechanisms will include surface adhesion, static friction, and mechanical interlocking of the mating contours of the cavity, imbedded objects and the hardened grout. The surface adhesion is similar in principal to that of hard water scale accumulation in pipes. The magnitude of the static friction depends on the pressure exerted by the grout, the area over which pressure is exerted, and the coefficient of static friction between the grout and the cavity. Regarding both surface adhesion and static friction, it is clear that, the larger the area of contact between the grout and cavity, the greater the anchor and sealing capabilities. In regard to mechanical interlocking, it should be apparent that the anchoring capabilities increase with increasing contour roughness of surfaces that confine the grout.

However, it should be noted that the cavity must provide continuing resistance in order to maintain the expansive stress generated by the expanding grout. Without this stress, the grout would have no frictional anchoring and the hardened grout would be free to slake into a loose, friable solid. Minor deformation of the cavity during initial grout expansion or later loading against the grout does not preclude the successful use of the invention, as the grout expansion will continue and make up for the increased volume.

In sealing or anchoring the expanding grout mixture is blended to have the desired physical properties for the application, such as viscosity, reaction rate, and magnitude of expansive stress generated.

The viscosity of the mix can be controlled by the relative proportions of wet and dry components. Additionally, the mix will thicken with time after the addition of water as a result of the hydration.

The rate of the hydration reaction can be controlled by such factors as the chemical composition of the hydrating crystals, the size of the hydrating crystals, agglomeration of the hydrating crystals, the addition of catalyst reagents to the grout mixture, and the temperature under which hydration takes place.

The stress generated by the reaction can be controlled by such factors as the chemical composition of the hydrating crystals, the amount of water in the hydrating grout-water mixture, the dimensions of the cavity into which the hydrating grout-water mixture is emplaced, the proportion of inert additives added to the hydrating grout water mixture, and the extent of hydration that occurs before the grout is confined in a cavity.

Expanding grout is prepared in the manner of mixing Portland cement by mixing dry compounds or a commercially available demolition grout with water.

In a down angled cavity, expanding grout is poured to the desired depth and then left to expand and generate the seal. In applications where pouring is not possible, the grout may be emplaced by pumping or packing.

Wadding is positioned in the cavity to control the excursion of emplaced expanding grout. Foam rubber, rags casing, and paper towels are preferred as the wadding material, but a wide range of additional materials are suitable. In a vertically oriented cavity, the grout can be emplaced above wadding capable of supporting the weight of the grout. In a horizontally oriented cavity, grout can be placed against wadding.

When anchoring objects within cavities, after preparing an expanding chemical grout in the manner described for sealing a cavity, an object is emplaced within the cavity prior to the addition of the expanding chemical grout or set into the grout filled cavity soon after the emplacement of the grout. After the grout is emplaced in the cavity around the object and the grout is given time to set and expand, the object within the grout will be anchored.

Devices such as washers may be used to assist in positioning articles within the expanding grout before hydration is advanced i.e. to position anchor rods away from cavity walls.

Objects anchored within the cavity and protruding outward may facilitate mechanical coupling between the cavity and other external articles. Threaded rod and weldable steel are examples of objects that can be anchored within a cavity with expanding grouts and later fastened to additional articles.

In fluid injection through a seal, the general method described above for anchoring objects within cavities is also employed, however, a tubular object is used. Emplacement of the tubular object is such that both ends of the tubular object protrude a substantial length from the expanding grout in which it is anchored.

The invention has been described in detailed specifics for purposes of illustration only, and it is to be understood that many changes in the intracacies of use in mining can be made without departing from the invention scope, which is defined by the appended claims.

What is claimed:

1. A method of sealing a cavity such as a bore hole, well, or fissure against passage of fluids without fracturing walls of said cavity comprising:
    placing in said cavity, a wadding material capable of confining the flow of a supply of hardenable and volume expandable chemical grout which occupies a given volume in its initial unhardened and unexpanded condition, and an increased volume relative to said given volume in its hardened condition to exert an expansive force against confining surfaces; and
    adding into said cavity and against said material capable of confining the flow, a hardenable and volume expandable non-explosive demolition chemical grout material adapted to exert pressure and effect an expanded seal upon curing between confining surfaces of the cavity and said wadding material capable of confining the flow.

2. The method of claim 1, wherein said wadding material capable of confining the flow of said grout is selected from fabric, casing, foam rubber, rags and paper towels.

3. The method of claim 2, wherein said chemical grout is obtained by: admixing about 20% by weight of water with about 80% by weight of a grouting composition composed of:

| | |
|---|---|
| $SiO_2$ | 0.6% |
| $Al_2O_3$ | 0.5% |
| $Fe_2O_3$ | 1.6% |
| CaO | 89.1% |
| MgO | 1.7% |
| $SO_3$ | .01% (trace) |
| Ignition Loss | 6.5% |

4. The method of claim 1, wherein a barrier to fluid movement is created within the cavity by expansion as result of a hydration reaction and accompanying crystal growth to create a seal.

5. A method of anchoring an object in a cavity such as a bore hole, well, or fissure without fracturing walls of said cavity, comprising:
    placing in said cavity, a wadding material capable of confining the flow of a supply of a hardenable and volume expandable chemical grout which occupies a given volume in its initial unhardened and unexpanded condition, and an increased volume relative to said given volume in its hardened condition to exert an expansive force against confining surfaces;
    placing an object within the cavity in a manner such that said object extends through the material capable of confining the flow and projects to a point outside of said cavity; and
    adding into said cavity against said material capable of confining the flow and around a portion of said object, a hardenable and volume expandable non-explosive demolition chemical grout material adapted to exert pressure and effect an expanded seal upon curing between confining surfaces of the cavity, object and material capable of confining the flow.

6. The method of claim 5, wherein said wadding material capable of confining the flow of said grout is selected from fabric, casing, foam rubber, rags and paper towels and said object is selected from threaded rods, high strength bolts, cables, and weldable steel.

7. The method of claim 6, wherein said chemical grout is obtained by: admixing about 20% by weight of water and about 80% by weight of a grouting composition composed of:

| | |
|---|---|
| $SiO_2$ | 0.6% |
| $Al_2O_3$ | 0.5% |

-continued

| | |
|---|---|
| Fe$_2$O$_3$ | 1.6% |
| CaO | 89.1% |
| MgO | 1.7% |
| SO$_3$ | .01% (trace) |
| Ignition Loss | 6.5% |

8. A method of enabling the injection of fluid under high pressure in a cavity such as a bore hole, well, or fissure without fracturing walls of said cavity, comprising:
 placing in said cavity, a wadding material capable of confining the flow of a supply of a hardenable and volume expandable chemical grout which occupies a given volume in its initial unhardened and unexpanded condition, and an increased volume in its hardened condition to exert an expansive force against confining surfaces;
 placing a conduit capable of transmitting fluid under high pressure within the cavity in a manner such that said conduit extends through said material capable of confining the flow and projects to a point outside of said cavity;
 adding into said cavity against said material capable of confining the flow and around a portion of said object, a hardenable and volume non-explosive demolition chemical grout material adapted to exert pressure and effect an expanded seal upon curing between confining surfaces of the cavity, conduit and material capable of confining the flow.

9. THe method of claim 8, wherein said wadding material of confining the flow of said grout is selected from fabric, casing, foam rubber, rags and paper towels and said conduit is selected from high pressure tubing or high pressure pipes.

10. The method of claim 8, wherein said chemical grout is obtained by: admixing about 20% by weight of water and about 80% by weight a grouting composition composed of:

| | |
|---|---|
| SiO$_2$ | 0.6% |
| Al$_2$O$_3$ | 0.5% |
| Fe$_2$O$_3$ | 1.6 |
| CaO | 89.1% |
| MgO | 1.7% |
| SO$_3$ | .01% (trace) |
| Ignition Loss | 6.5% |

* * * * *